United States Patent
Hugon et al.

(10) Patent No.: US 10,787,960 B2
(45) Date of Patent: Sep. 29, 2020

(54) TRANSMISSION DEVICE OF AN ENGINE, PARTICULARLY FOR AN ENGINE WITH VARIABLE COMPRESSION RATE AND/OR VARIABLE DISPLACEMENT

(71) Applicants: MCE 5 Development, Lyons (FR); Vianney Rabhi, Lyons (FR)

(72) Inventors: Rodolphe Hugon, Saint Bonnet de Mure (FR); Sylvain Bigot, Pau (FR); Matthieu Duchemin, Vaulx en Velin (FR); Guillaume Delobre, Bron (FR); Benoit Schwenck, Lyons (FR)

(73) Assignees: MCE 5 Development, Lyons (FR); Vianney Rabhi, Lyons (FR)

( * ) Notice: Subject to any disclaimer, the term of this patent is extended or adjusted under 35 U.S.C. 154(b) by 16 days.

(21) Appl. No.: 15/534,988

(22) PCT Filed: Dec. 9, 2015

(86) PCT No.: PCT/FR2015/053391
§ 371 (c)(1),
(2) Date: Jun. 9, 2017

(87) PCT Pub. No.: WO2016/092211
PCT Pub. Date: Jun. 16, 2016

(65) Prior Publication Data
US 2017/0350316 A1    Dec. 7, 2017

(30) Foreign Application Priority Data
Dec. 12, 2014 (FR) .................... 14 62389

(51) Int. Cl.
*F02B 75/04* (2006.01)
*F16C 9/04* (2006.01)
(Continued)

(52) U.S. Cl.
CPC ............ *F02B 75/045* (2013.01); *F02B 75/04* (2013.01); *F16C 7/023* (2013.01); *F16C 9/04* (2013.01);
(Continued)

(58) Field of Classification Search
CPC ........ F02B 75/045; F02B 75/04; F16H 19/04; F16C 7/023; F16C 9/04; F16C 2360/22; F16C 23/04; F16C 5/00
See application file for complete search history.

(56) References Cited

U.S. PATENT DOCUMENTS 6,354,252 B1 * 3/2002 Rabhi .................... F01B 9/047
                                                       123/78 BA
6,601,551 B1 * 8/2003 Rabhi .................... F01B 9/047
                                                       123/197.1
(Continued)

FOREIGN PATENT DOCUMENTS

CN        1950596 A      4/2007
DE        4034808 A1     5/1991
(Continued)

OTHER PUBLICATIONS

International Search Report for International Application No. PCT/FR2015/053391 dated Jul. 7, 2016, 3 pages.
(Continued)

*Primary Examiner* — Lindsay M Low
(74) *Attorney, Agent, or Firm* — TraskBritt

(57) ABSTRACT

A transmission device, particularly for an engine with variable compression rate and/or variable displacement, includes, in a cylinder housing: a combustion piston capable of moving in a combustion cylinder of the engine and secured to a transmission member; a gear engaging with a first rack of the transmission member and providing transmission of the movement between the combustion piston
(Continued)

and a crankshaft of the engine; a connecting rod engaging, at a first end, with the gear and, at a second end, with the crankshaft; and a control member engaging with the gear and secured to a control piston. The combustion piston and the transmission member are slidably linked with the cylinder housing in a main direction.

14 Claims, 11 Drawing Sheets

(51) Int. Cl.
*F16C 7/02* (2006.01)
*F16H 19/04* (2006.01)
*F16C 23/04* (2006.01)

(52) U.S. Cl.
CPC .............. *F16H 19/04* (2013.01); *F16C 23/04* (2013.01); *F16C 2360/22* (2013.01)

(56) References Cited

U.S. PATENT DOCUMENTS

| | | | | |
|---|---|---|---|---|
| 7,013,849 B2* | 3/2006 | Rabhi | ................... | F01B 9/047 |
| | | | | 123/48 B |
| 7,562,642 B2* | 7/2009 | Rabhi | ................... | F01B 9/02 |
| | | | | 123/48 B |
| 8,065,909 B2* | 11/2011 | Rabhi | ................... | F01B 9/047 |
| | | | | 73/114.16 |
| 8,439,004 B2* | 5/2013 | Rabhi | ................... | F02B 75/048 |
| | | | | 123/197.1 |
| 8,875,671 B2* | 11/2014 | Vianney | ............... | F02B 75/045 |
| | | | | 123/197.1 |
| 2004/0168669 A1 | 9/2004 | Rabhi | | |
| 2008/0017023 A1* | 1/2008 | Rabhi | ................... | F01B 9/02 |
| | | | | 92/13.7 |
| 2011/0048382 A1* | 3/2011 | Pattakos | ............... | F02B 75/045 |
| | | | | 123/48 B |
| 2011/0198887 A1* | 8/2011 | Rabhi | ................... | F02B 33/22 |
| | | | | 296/193.01 |
| 2014/0086769 A1* | 3/2014 | Barnett, Jr. | ........... | F04B 53/144 |
| | | | | 417/437 |

FOREIGN PATENT DOCUMENTS

| | | |
|---|---|---|
| EP | 1407125 A1 | 4/2004 |
| EP | 1979591 A2 | 10/2008 |
| EP | 1740810 A1 | 1/2017 |
| FR | 2810696 A1 | 12/2001 |
| FR | 2867515 A1 | 9/2005 |
| FR | 3027051 | 4/2016 |
| GB | 2324838 A | 11/1998 |
| JP | 2002-530579 A | 9/2002 |
| JP | 2005-509106 A | 4/2005 |
| JP | 2007-538187 A | 12/2007 |
| JP | 2009-533581 A | 9/2009 |
| KR | 10-2006-0130243 A | 12/2006 |
| KR | 10-2008-0086521 A | 9/2008 |
| KR | 10-2004-0021639 A | 10/2010 |
| WO | 03008783 A1 | 1/2003 |

OTHER PUBLICATIONS

International Written Opinion for International Application No. PCT/FR2015/053391 dated Jul. 7, 2016, 8 pages.
Chinese Second Office Action for Chinese Application No. 201580073994, dated Jun. 5, 2019, 17 pages with English Translation.
Japanese Notice of Reasons for Refusal for Japanese Application No. 2017-531360 dated Sep. 17, 2019, 10 pages.
Korean Notification of Reason for Refusal for Korean Application No. 10-2017-7019230, dated Sep. 23, 2019, 12 pages with English Translation.

* cited by examiner

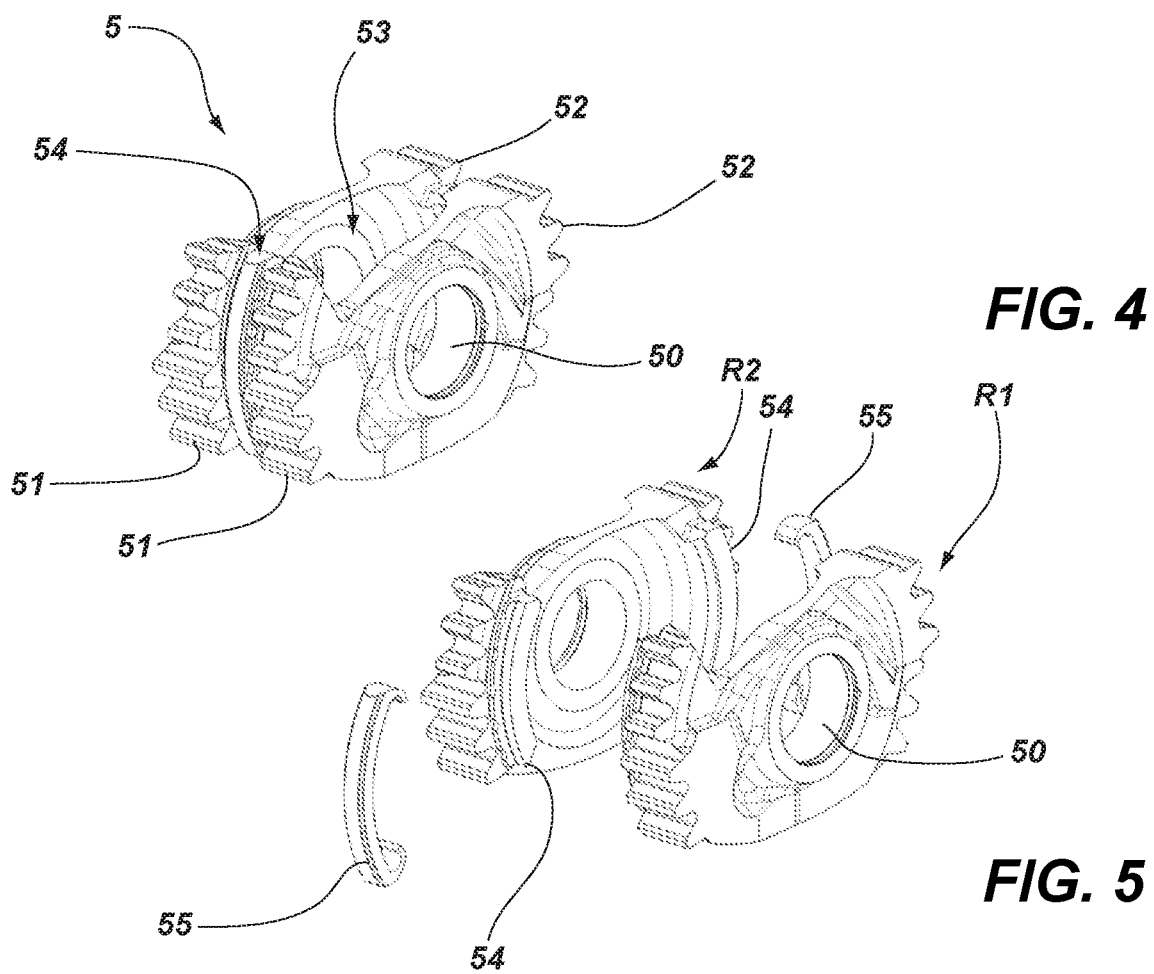
FIG. 4
FIG. 5
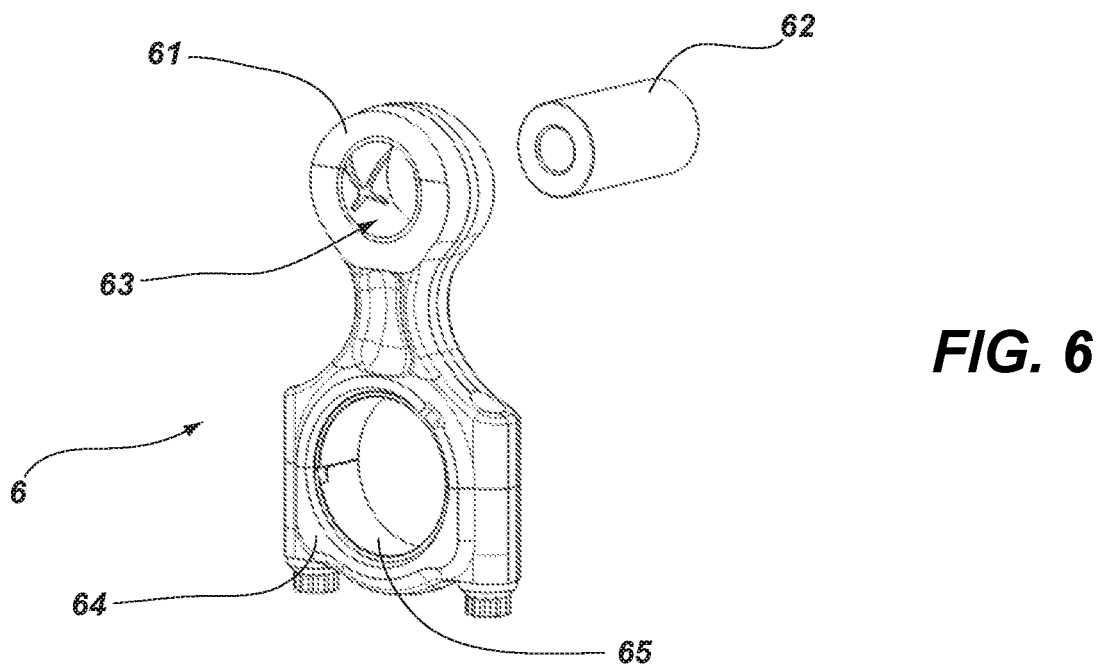
FIG. 6

TRANSMISSION DEVICE OF AN ENGINE, PARTICULARLY FOR AN ENGINE WITH VARIABLE COMPRESSION RATE AND/OR VARIABLE DISPLACEMENT

CROSS-REFERENCE TO RELATED APPLICATIONS

This application is a national phase entry under 35 U.S.C. § 371 of International Patent Application PCT/FR2015/053391, filed Dec. 9, 2015, designating the United States of America and published as International Patent Publication WO 2016/092211 A2 on Jun. 16, 2016, which claims the benefit under Article 8 of the Patent Cooperation Treaty to French Patent Application Serial No. 1462389, filed Dec. 12, 2014.

TECHNICAL FIELD

The invention relates to a transmission device for an engine, particularly for an engine with a variable compression rate and/or a variable displacement.

BACKGROUND

Such a device is known from Patents EP1407125, FR2867515 or FR2810696. It comprises, in a cylinder housing:
- a combustion piston, capable of moving in a cylinder of the engine and secured to a transmission member;
- a gear engaging with a first rack of the transmission member and providing transmission of movement between the combustion piston and a crankshaft of the engine;
- a connecting rod engaging, at a first end, with the gear and, at a second end, with the crankshaft.

A control member, also engaging with the gear making it possible to adjust the position of the gear in the engine, and to move the end of the piston stroke in the cylinder. An engine is thus obtained with a compression rate and, if necessary, a displacement which may be variable.

The cylinder housing elements may be made of different materials so as to optimize the overall weight of the engine without compromising performance thereof. Thus, people often chose to use a steel crankshaft, whereas the cylinder housing is often made of aluminum. In this case, and as a result of the heating of the engine components during operation thereof, the differential expansion between the various materials of the parts, results in a movement of the mobile members of the transmission device with respect to each other.

Accordingly, during the operation of the engine, the moving members of the transmission device are thus placed in a position of equilibrium, which may deviate from the initially desired design position. This position of equilibrium, in the transmission devices known in the state of the art, is not controlled. It results from the degrees of freedom and degrees of blocking imposed by the nature of the links between the various moving members composing the transmission device. This position of equilibrium, when not controlled, may lead to excessive wear of the component parts of the mobile members; or be a source of running noise. Several stable positions of equilibrium, in which the moving members can be placed according to the nature of the disturbance they receive and which move the same away from their design positions, may also exist.

FIGS. 1A and 1B thus schematically show a design position and a position of equilibrium of some mobile members of the transmission device of an engine with variable compression rate of the prior art, respectively.

The crankshaft 9 rests on the bearings of a cylinder housing 100, having 3 cylinders identified as a, b, and c in FIGS. 1A and 1B. In each cylinder, a combustion piston 2a, 2b, 2c is secured to a transmission member 3a, 3b, 3c. The connecting rods 6a, 6b, 6c are respectively linked to the gears 5a, 5b, 5c and to the crankshaft 9.

The crankshaft 9, which is made of steel, expands less than the cylinder housing 100, which is made of aluminum. Accordingly, the crank pins of the crankshaft 9, which the connecting rods are associated with, are no longer perfectly aligned with each of the cylinders a, b, and c. It can thus be seen in FIG. 1B that the mobile members associated with the cylinders a, b are placed in a position of equilibrium which deviates from the design position of FIG. 1A, in which the mobile members of the same cylinder assembly are aligned with each other and parallel to the main axis of the cylinder. The cylinder c is in the design position.

This uncontrolled position of equilibrium leads to accelerated wear of the mobile members, specifically at levels I and II of the connecting rod bearings and the piston skirts which are submitted to particularly high friction as can be seen in FIG. 1B. And friction, in general, can significantly reduce the engine efficiency and/or the transmitted power.

In addition to the phenomenon of differential expansion that has just been described, other phenomena may cause disturbance leading to placement of the mobile members of the transmission device in a position of equilibrium different from the design position. This may be, for example, wear of the members, the deformation under load thereof or the presence of excessive running clearances.

BRIEF SUMMARY

An object of the invention is therefore to determine the nature of the links between some mobile members of a transmission system of an engine so as to control the operating position occupied by such members, when the transmission device is subjected to disturbances.

The invention specifically aims at avoiding or limiting friction that appears at the piston skirts and/or at the rod bearings as a result of the differential expansion of the crankshaft and of the cylinder housing.

In order to reach this goal, the object of the invention provides for a transmission device for an engine with variable compression rate and/or variable displacement, comprising, in a cylinder housing:
- a combustion piston, capable of moving in a combustion cylinder of the engine and secured to a transmission member;
- a gear engaging with a first rack of the transmission member and providing transmission of the movement between the combustion piston and a crankshaft of the engine;
- a connecting rod engaging, at a first end, with the gear and, at a second end, with the crankshaft;
- a control member engaging with the gear and secured to a control piston.

According to the invention, the transmission device is characterized in that the combustion piston and the transmission member are slidably linked with the cylinder housing in a main direction.

The formation of friction at the combustion piston skirt is thus avoided or limited by perfectly controlling the operating position of the piston, even in case of disturbances.

The link between the gear and the connecting rod advantageously comprises an annular linear link in the longitudinal direction; the link between the gear and the transmission member comprises an annular linear link in a main direction; and the link between the gear and the control member comprises an annular linear link in a main direction.

Thus, the gear can be positioned in alignment with the transmission member in a longitudinal direction of the engine; and the connecting rod can move in a longitudinal direction and accommodate the disturbances, such as those resulting from the differential expansion of the crankshaft. Friction and wear on the connecting rod bearings are thus avoided or reduced.

The link between the control piston and the cylinder housing preferably comprises an annular linear link in the main direction and having a center formed by the control piston.

The control member and the control piston make it possible to close the kinematic link between the gear and the cylinder housing, and such link makes it possible to improve the angular position along a main axis of the gear relative to the connecting rod and thus leads to a better control of friction between the gear and the connecting rod, especially at the connecting rod bearings.

According to a first embodiment, and to improve the control of the rotational movements of the control member, the link between the control member and the cylinder housing comprises a straight linear link in the longitudinal direction. And in an alternative solution of this first embodiment, the link between the control member and the cylinder housing includes an annular linear link in the main direction.

According to other advantageous and not restricting characteristics of the invention, taken alone or in combination:
- the sliding link consists of:
  - an annular linear link between the combustion piston and the combustion cylinder in the main direction and having a center formed by the combustion piston;
    - a straight linear link defining a straight linear contact line in the longitudinal direction and a punctual link defining a single contact point in the longitudinal direction between the transmission member and the cylinder housing.
  - the straight linear link between the transmission member and the cylinder housing is provided by a roller bearing on a plate of the cylinder housing and on the transmission member.
- the punctual link between the transmission member and the cylinder housing includes a rib and a guide groove adapted to receive the rib, with one being arranged on the roller and the other one being arranged on the transmission member.
- the gear has a central hole wherein a bore for the positioning of a connecting rod eye by means of a transmission shaft and wherein the annular linear link between the gear and the connecting rod is obtained by:
  - a spacing between the inner surfaces of the central hole of the gear and the side faces of the connecting rod eye enabling the translational movement of the connecting rod on the transmission shaft;
    - a rounded profile of the connecting rod eye bore for the swiveling of the connecting rod in the central hole.
  - the annular linear link between the gear and the transmission member respectively comprises a roll band of the gear in contact with a raceway of the transmission member, the bulging and U-shapes of which are engaged one in the other.
  - the annular linear link between the gear and the control member respectively comprises a roll band of the gear in contact with a raceway of the control member, the bulging and U-shapes of which are engaged one in the other;
- the straight linear link between the control member and the cylinder housing is provided by the contact between a bearing surface of the control member and a surface of the cylinder housing, with one being cylindrical with a longitudinal axis, and the other one being flat.
- According to an alternative solution, the annular linear link between the control member and the cylinder housing is provided by a body consisting of a spherical portion in contact with a matching hole of the cylinder housing, with the body having, on the side opposite the spherical portion, a tab or a groove respectively engaging with a groove or a tab of the control member.
- the cylinder housing is provided with a pressing device for compensating running clearances.

BRIEF DESCRIPTION OF THE DRAWINGS

The invention will be better understood when reading the following description of a particular and not restrictive embodiment while referring to the appended figures among which:

FIGS. 4 and 5 show perspective and exploded views of the gear in a particular exemplary implementation of the invention.

FIG. 6 shows a perspective view of the connecting rod in a particular exemplary implementation of the invention.

DETAILED DESCRIPTION

In the following description and while referring to the figures, the following definitions will be used, by convention:
- the longitudinal direction is the direction defined by the major axis of the crankshaft 9;
- the main direction is the direction defined by the major axis of the combustion piston 2;
- the transverse direction is the direction defined by the direction perpendicular to the previous two directions.

In addition, in the present application, "disturbances" will mean the phenomena tending to place the mobile members, when the engine is running, in a position of equilibrium different from the design position. It may be, for example, wear or the manufacturing tolerance of the members leading to dimensions which deviate from their exact design dimensions, or movements related to the differentiated expansion between such members, to the deformation under load thereof or to the presence of excessive running clearances.

Figure 2:
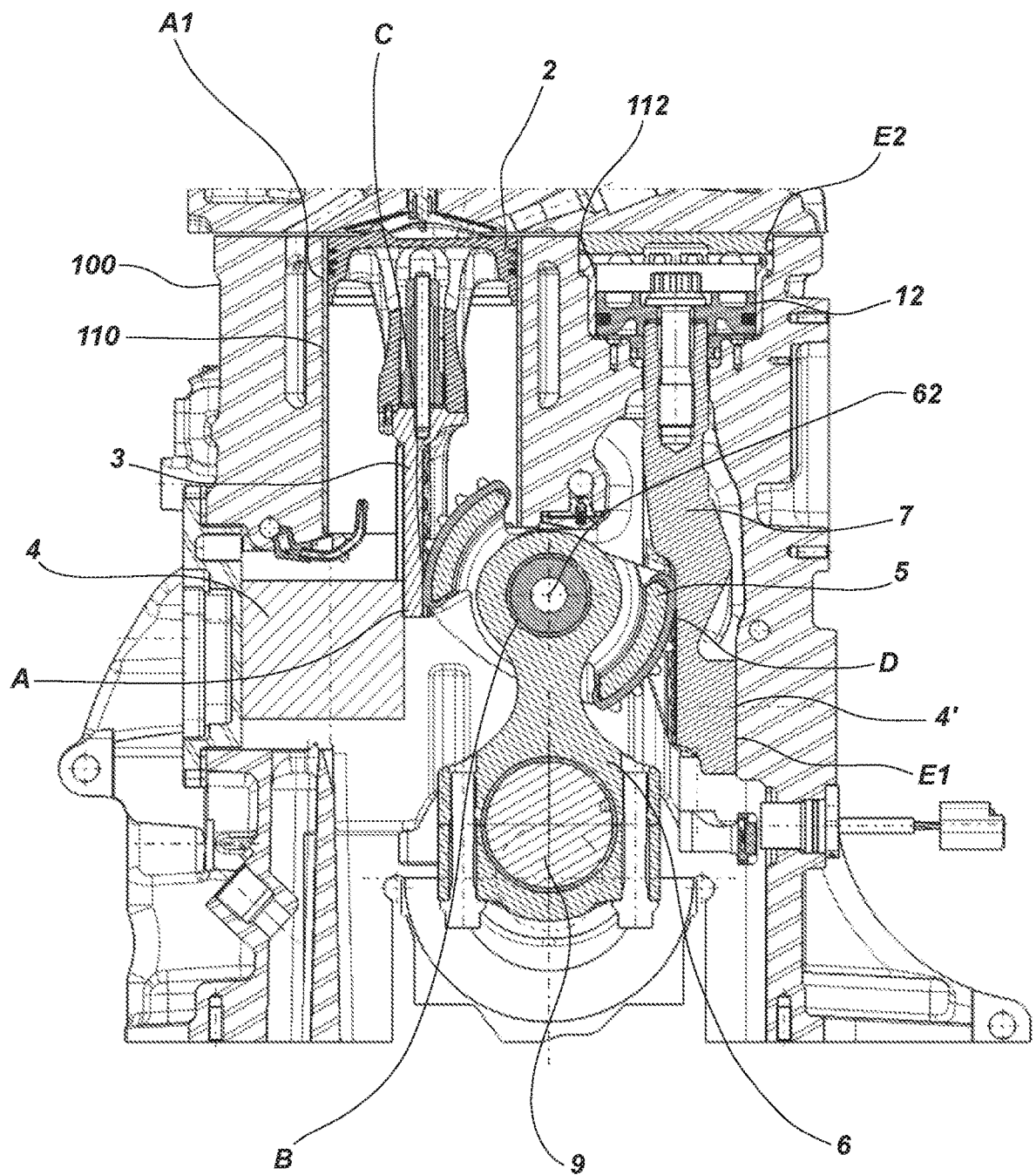
FIG. 2 shows a principle sectional view of an engine with variable compression rate.

In FIG. 2, which shows a principle section view of an engine with variable compression rate and/or variable displacement, a cylinder housing 100 includes at least one combustion cylinder 110 wherein a combustion piston 2 moves in a guided translation causing the rotation of a crankshaft 9 through a transmission device 1.

The transmission device 1 comprises a transmission member 3 secured to the combustion piston 2 and first engaging with a first connecting device 4 supported by a wall of the cylinder housing 100 and, on the other hand, with a first side of a gear 5.

The transmission member 3 is provided, on one of its faces, with a large rack, the teeth of which are engaged with those of the gear 5.

The gear 5 is connected, via a transmission shaft 62, to a first end of a connecting rod 6. The second end of the connecting rod 6 is connected to a crankshaft 9, so as to execute the transmission of the movement.

The gear 5 engages on a second side, opposite the transmission member 3, with a rack of a control member 7 capable of moving in the main direction in engagement with a second connecting device 4'.

The control member 7 is controlled by a control device comprising a cylinder consisting of a control piston 12 guided in a control cylinder 112 of the cylinder housing 100. The control device ensures the translational movement of the control member 7 in the main direction.

In operation, the translational movement of the combustion piston 2 and of the transmission member 3 integral therewith, is initiated and maintained by the combustion of the mixture in the combustion cylinder 110. Such movement is guided by the existing link between the combustion piston 2 and the combustion cylinder 110, and the linking device 4. The movement is transmitted to the assembly formed by the gear 5 and the connecting rod 6 to move the crankshaft 9 in rotation. The position of the control member 7 is adjusted in the main direction by the control device. The movement thereof is guided by the second connecting device 4' in this direction. The movement of the control member 7 causes the pivoting of the gear 5, which results in moving the end of the stroke of the combustion piston 2 in the combustion cylinder 110. The engine compression rate and/or capacity thus varies.

According to the invention, the nature of the links between some mobile members that have just been listed is so determined as to control the operating position occupied by such members, when the transmission device 1 is subjected to disturbances.

"Controlling the operating position" means that the degrees of freedom and the degrees of blocking defining the nature of the links facilitate a movement of the parts of the mobile members relative to their ideal locations of design toward a position, which does not lead to excessive operating friction. Within the scope of this application, a degree of freedom or such movement will be considered as "locked" to the extent that this degree of freedom or this movement cannot exceed the required minimum clearance. For example, in order to stop a translational movement between two components having a mutually different degree of functional freedom, a maximum clearance of 0.04 mm to 0.2 mm is allowed in the direction of translation to be locked.

It should be noted that such an analysis is not easy, since not only should each link be studied, but also the interactions between each link, too, for each one of the degrees of freedom and/or of blocking in order to determine the most favorable combination. It should also be noted that the multiple blocking of some degrees may lead to the development of constraints in parts, thus, promoting wear thereof, and that, on the contrary, excessive (relative to the expected functionality of each member) degrees of freedom can lead to the malfunction of the device when it is subjected to disturbances, as has been stated in the introduction of this application.

The prototypes and thorough studies conducted by the inventors of this application have thus shown that some main links of the transmission device 1, which has just been described should be precisely determined, among which:

the link between the assembly formed by the combustion piston 2 and the transmission member 3, and the cylinder housing 100.

the link between the gear 5 and the connecting rod 6.

the link between the gear 5 and the transmission member 3.

the link between the gear 5 and the control member 7.

The exact nature of each of these links is disclosed in detail in the following paragraphs of the present description.

For example, links A between the assembly may be formed by the combustion piston 2 and the transmission member 3, and the cylinder housing 100.

According to the invention, the assembly of the combustion piston 2 and the transmission member 3 is slidably linked A with the cylinder housing 100 in a main direction.

As is known per se, the sliding link provides five degrees of blocking and allows a single translational movement.

According to the invention, any movement of the transmission member 3 other than a translation in a main direction should thus be locked. In other words, the linking device 4 is so configured as to block any movement of the transmission member 3 other than a translation in a main direction. This more particularly relates to the blocking of a swiveling movement in the cylinder 110 of the transmission member 3 and the combustion piston 2, which would induce friction on the inner walls of this cylinder.

In order to minimize friction between the parts of the link, such sliding link A is preferably broken down into:

an annular linear link A1 between the combustion piston 2 and the combustion cylinder 110, the center of which is formed by the piston 2 in the main direction.

a straight linear link A21 in the longitudinal direction is combined with a punctual link A22 in the longitudinal direction between the transmission member 3 and the cylinder housing 100.

The annular linear link A1 opposes the two translations in the longitudinal and transverse directions of the combustion piston 2, with all the other movements being free. This ensures minimum friction between the contact surfaces of the combustion piston 2 with that of the combustion cylinder 110.

The straight linear link A21 opposes the translation of the transmission member 3 in the transverse direction and the rotation thereof along the main axis of the combustion cylinder 110.

Eventually, the punctual link A22 provides the fifth degree of blocking of the sliding link that opposes the translation of the transmission member 3 in the longitudinal direction.

This ensures that the translational movement in the main direction of the assembly formed by the combustion piston 2 and the transmission member 3 relative to the cylinder housing 100 only remains free. Friction at the skirt of the combustion piston and the cylinder is thus prevented, or limited. The other five possible degrees of freedom of such member are blocked, thus avoiding any strain to the parts that might cause situations that could cause excessive friction and/or noise operation, or the wear thereof.

Link C Between the Gear 5 and the Transmission Member 3

It should be reminded that the gear 5 engages with a large rack formed on the transmission member 3. In this respect, the link C between the gear 5 and the transmission member 3 comprises a first rack and pinion link.

This rack and pinion link can be defined as a straight linear link, wherein the gear toothing is represented by a line substantially parallel to the axis of the gear passing through the pitch circle of the toothing and the rack toothing is represented by a plane oriented along the pressure angle of the teeth, commonly 20°. This link has:
- two degrees of freedom in translation in the plane which defines same,
- two degrees of freedom in rotation, one for the axis defined by the direction of the line, with the other one being defined by the normal to the plane characterizing the link.

According to the invention, the link C between the gear 5 and the transmission device 3 further includes an annular linear link in the main direction.

This combination of links results in the blocking of the relative translational movement in the longitudinal and transverse directions between the gear 5 and the transmission member 3, and in allowing the rotational movements along the longitudinal and main axes of the gear 5 relative to the transmission member 3 and the translation movement along the main axis.

According to the invention, the gear 5 has to be maintained centered on the large rack of the transmission member 3, without thereby inducing significant constraints on the gear 5 or on the control member 7. The gear 5 and/or the transmission member 3 are so configured as to be maintained centered relative to one another.

It should be noted that, in the solutions known from the art, the sliding longitudinal movement of the gear 5 on the transmission member 3 was possible. For this purpose, the width of the teeth of the gear 5 was so reduced as to enable this sliding movement.

According to the present invention, the blocking of this translational movement by the link C makes it possible to optimize the width of the teeth of the gear 5 and thus to maximize the load that can be transmitted by the transmission device 1. The engine performances are thus improved for unchanged overall dimensions of the components (best engine torque and higher rating).

Link D Between the Gear 5 and the Control Member 7

Figure 3A:
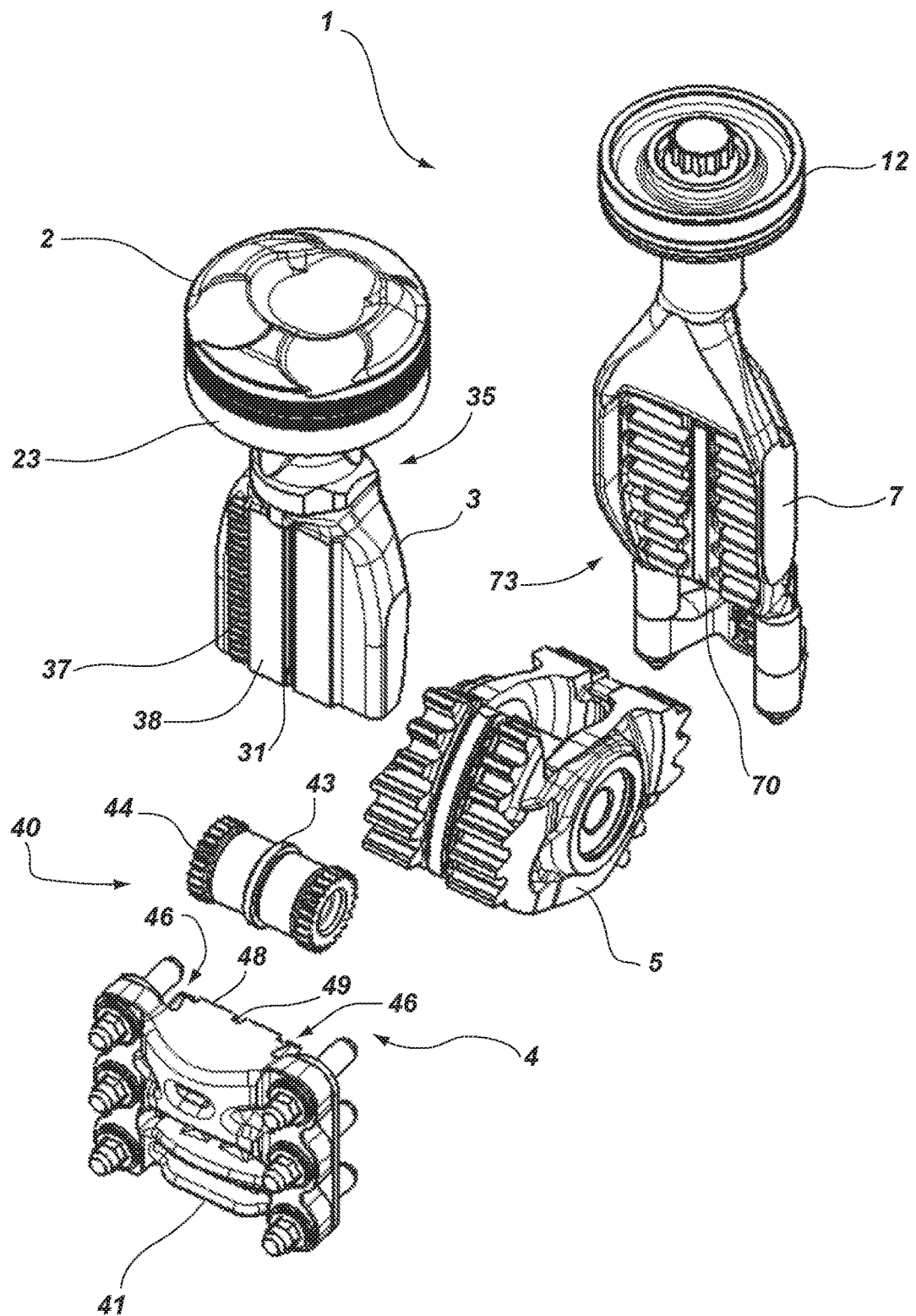
FIGS. 3A and 3B show perspective and exploded views of some elements of the transmission device according to a specific exemplary implementation of the invention.
Figure 3B:
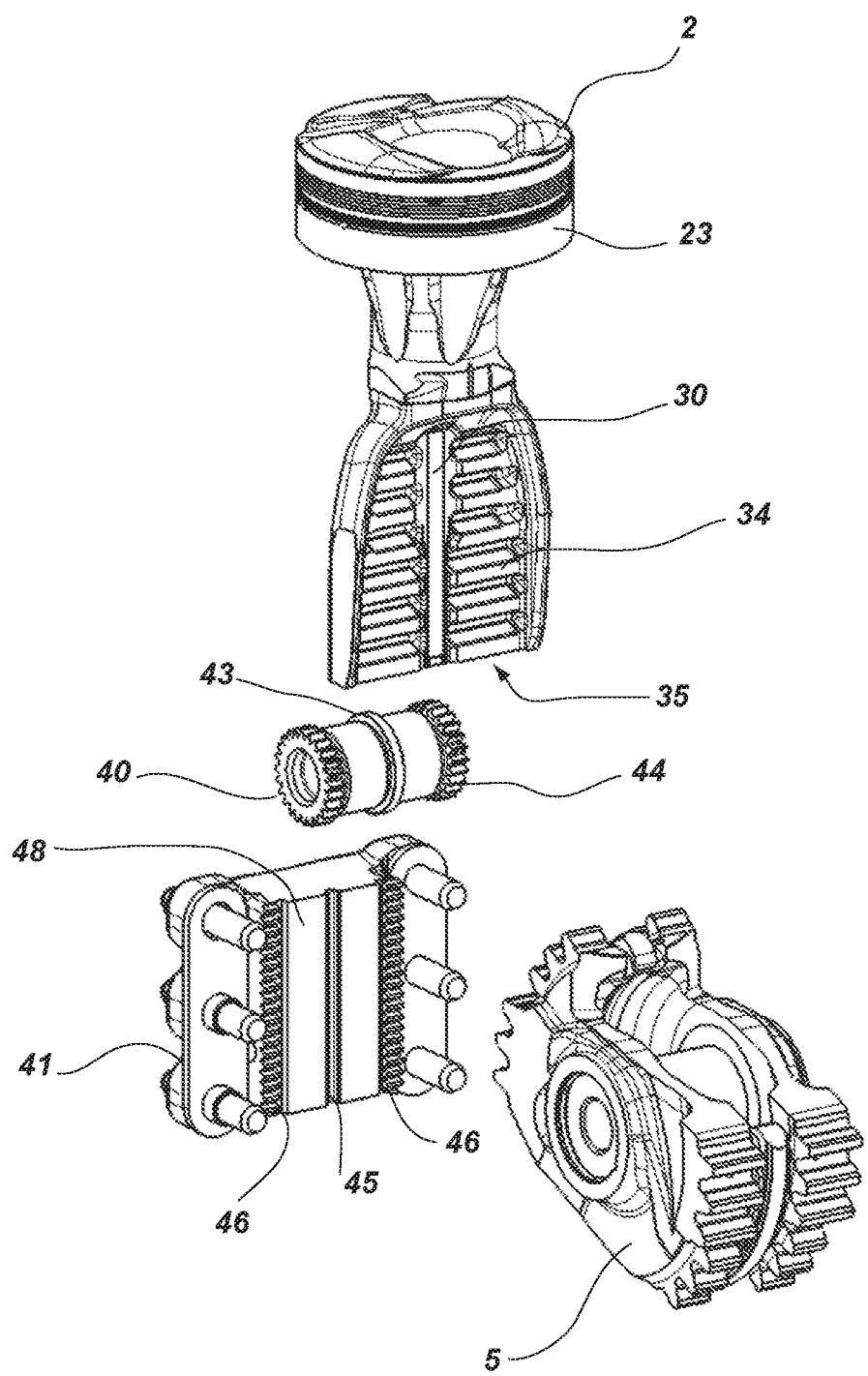
Figure 3C:
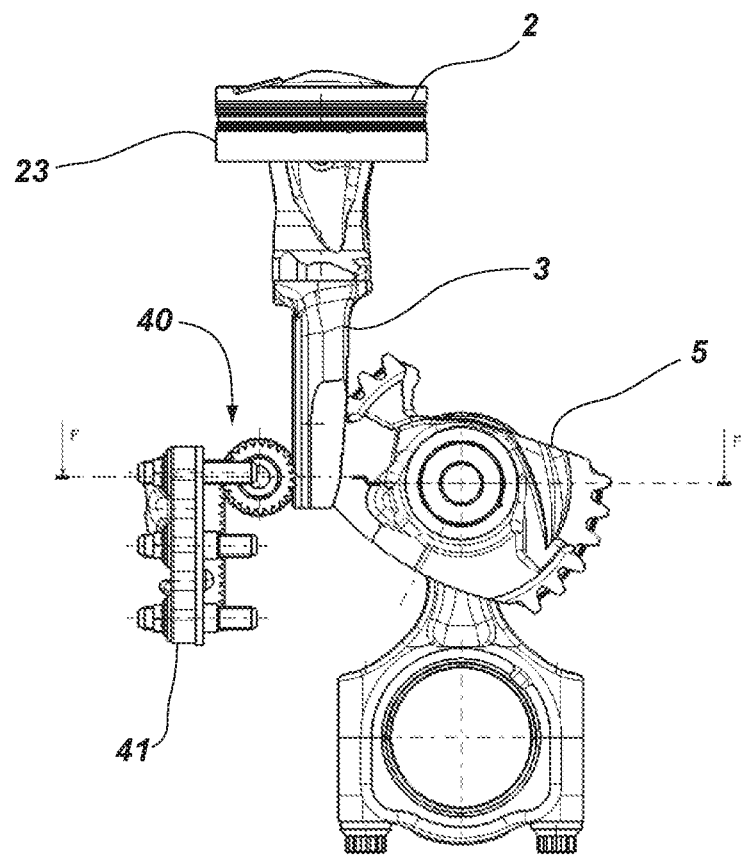
FIG. 3C shows a side view of some elements of the transmission device according to a particular exemplary implementation of the invention.

The transmission device 1 (FIG. 3A) also comprises a control device 7 for adjusting the end of the piston stroke in the combustion cylinder 110.

The link D between the gear 5 and the control member 7 includes an annular linear link in the main direction. The control member 7 is provided with a large rack engaging with the gear 5, and the link also includes a rack and pinion link.

The location of this link is thus perfectly similar to the link C seen above. And, the gear 5 and/or the control member 7 are accordingly so configured as to be maintained centered with respect to one another, too.

This combination of links, therefore, leads to block the relative translational movements in the longitudinal and transverse directions between the gear 5 and the control member 7 and enable the rotational movements along the longitudinal and main axes of the gear 5 relative to the transmission member 7 and the translational movement along the main axis.

The issue is thus to prevent constraints from applying to the gear 5 and leading to moving same from the plane in which the previous links hold same.

The combination of links A, C and D makes it possible to position the transmission member 3, the gear 5 and the control member 7 in alignment and in a position determined relative to the cylinder housing 100.

Link B Between the Gear 5 and the Connecting Rod 6

According to the invention, the link B between the gear 5 and the connecting rod 6 comprises an annular linear link in the longitudinal direction.

As seen previously, an annular linear link opposes two translational movements. In this case, the issue is opposing the translation in the main and cross directions of the connecting rod 6 relative to the gear 5. All the other movements are free.

The rotation of the connecting rod 6 relative to the gear 5 is required to transform the translational movement in the main direction of the axis of the gear 5 into a rotational movement of the crankshaft 9 along the longitudinal axis.

The translation of a connecting rod eye 61 in a longitudinal direction relative to the gear 5 makes it possible to hold the connecting rod 6 parallel to the axis of the combustion cylinder 110 even when a rod head 64 is moved, as a result of the differential expansion of the crankshaft 9 relative to the cylinder housing 100. The position of equilibrium of the connecting rod 6 in the transmission device 1 also makes it possible to prevent or limit wear of the connecting rod bearings, and ensures a maximum power transmission.

The link B enables free rotational movements between the connecting rod 6 and the gear 5 about the longitudinal axis, the transverse axis and about the main axis. These last two rotations (about the transverse axis and about the main axis) make up for the perpendicularity defects that may exist, for example, between the combustion cylinder 110 and the crankshaft 9, and in this case also, reduce friction which occurs in the transmission device 1.

Generally, the annular linear link B between the gear 5 and the connecting rod 6 makes it possible to dissociate the positioning, in a first plane, of the "high" mobile members of the transmission device 1 (the combustion piston 2, the transmission member 3, the gear 5 and the control member 7), from the positioning in a second plane different, from the first one, and substantially parallel thereto, of the "low" mobile member of the device (the connecting rod 6, the crankshaft 9).

The combination of links A, B, C and D, which have just been listed, lead to promote when the engine is running and is independent of the disturbances that it is subjected to, as well as the alignment of the gear 5 with the transmission member 3 and the control member 7. The link between the gear 5 and the connecting rod 6 is free enough, as seen above, to prevent the gear 5 from being driven by the movement of the crankshaft 9 along the longitudinal axis.

In other words, the mobile members of the transmission device 1, which have just been described, are all positioned along the longitudinal axis in relation to the walls of the cylinder housing 100 and not, as was the case in the described solutions of the prior art, relative to the position of the crankshaft 9, through the connecting rod.

Link E Between the Control Member 7 and the Cylinder Housing 100

The link E between the control member 7 and the cylinder housing 100 comprises, in the lower part thereof, a straight linear link E1 in the longitudinal direction. The connecting element 4' is so configured as to provide this link.

This link has two degrees of blocking which enable it on the one hand to maintain the control member 7 against the cylinder housing 100 and, on the other hand, to prevent the rotation of this member about its main axis, i.e., in the main direction defined above.

This link also makes it possible to keep free the translational movement required to operate the engine in the main direction of the transmission member 7.

To absorb the geometrical defects, which may exist between the mobile members in the transverse direction, the link E1 can be supported by a running clearance compensating system, as described, for example, in EP1740810, EP1979591 or in the application FR14/59791 dated Mar. 10, 2014.

As seen above, the control member 7 is secured to a control piston 12 guided in the control cylinder 112. The link E also comprises a link E2 between the control piston 12 and the control cylinder 112 having an annular linear nature and having a center formed by the control piston 12 in the main direction.

However, for a given rate adjustment, i.e., when the position of the control piston 12 is fixed in the control cylinder 112, this link E2 has a degree of freedom in translation in the main direction blocked, which reduces it to a simple ball joint.

In this configuration, the rotational movement of the control member 7 relative to the cylinder housing 100, about an axis of rotation passing through its apex and in the transverse direction, is preserved. This movement makes it possible to absorb the disturbances that develop in the transmission device during the operation thereof, which could reduce its mechanical efficiency.

The combination of the links E1 and E2, in combination with the links A, C and D which have just been disclosed, ensures a sliding link between the assembly formed by the control member 7 and the control piston 12 and the cylinder housing 100.

The Link E' Between the Control Member 7 and the Cylinder Housing 100

According to a variant of the preferred embodiment for implementing the invention, the link E' between the control member 7 and the cylinder housing 100 comprises, in its lower part, an annular linear link E'1 in the main direction. The linking element 4 is so configured, in this embodiment, as to provide such a link.

This link has two degrees of blocking which enable same, on the one hand, to maintain the control member 7 against the cylinder housing 100 and, on the other hand, to prevent the translation of the lower part of the control member 7 in a longitudinal direction.

This link also makes it possible to maintain free the translational movement required to operate the engine in the main direction of the control member 7, as well as the rotation of the control member 7 about the main axis.

Similarly to the variant E, the link E'1 can be supported by a running clearance compensating system.

The link E' also comprises a link E'2 between the control piston 12 and the control cylinder 112 having an annular linear nature and a center formed by the control piston 12 in the main direction.

However, and similarly to the variant E, for a given rate adjustment, this link E'2 has a degree of freedom in translation in the main direction blocked, which reduces it to a simple ball joint.

In this configuration, the rotational movement of the control member 7 relative to the cylinder housing 100, about an axis of rotation passing through its apex in the main direction, is preserved. This movement makes it possible to absorb the disturbances that could reduce its mechanical efficiency.

The combination of the links E'1, E'2, in combination with the links A, C and D, which have just been disclosed, ensures a sliding link between the assembly formed by the control member 7 and the control piston 12 and the cylinder housing 100.

Exemplary Implementation of the Invention

FIGS. 3A, 3B, 3C and 3D show a particular exemplary implementation of the transmission device 1, according to the invention.

The combustion piston 2 is provided with a guide skirt 23. When, as is the case, the guide skirt 23 has a low height relative to the diameter of the combustion cylinder 110 (FIG. 2), the link between the combustion piston 2 and the combustion cylinder 110 forms the annular linear link A1 between same.

The combustion piston 2 can be made of a thick disc provided with grooves receiving the top compression rings, the compression rings, and the scraper rings, as is well known per se.

The quality of this link can be improved by giving the guide skirt 23 a slightly bulging shape thereby limiting the intensity of friction, which occurs at the contact surfaces.

The link between the transmission member 3 and a wall of the cylinder housing 100 (FIG. 2) is provided by the connecting device 4. The latter provides, in a preferred embodiment, for the straight linear link A21 and the punctual link A22.

The connecting device 4 includes a roller 40 consisting of a cylindrical body and whereon the respective surfaces 48, 38 of a plate 41 are supported, secured to the cylinder housing 100 and to the transmission member 3. The roller 40 provides for a straight linear link A21 in the longitudinal direction. In order to synchronize the movement of the combustion piston 2 and of the roller 40, the latter may be provided with gears 44 at each of its ends, engaging with racks 46 associated with the plate 41, on the vertical edges thereof. The first and/or the second pinion 44 of the roller 40 may also engage with a rack 37 of the transmission member 3. The punctual link A22 may be formed by providing a cylindrical body 42 of the roller 40 with a guide rib 43. This guide rib 43 may be placed in the middle of the cylindrical body between the pinions 44. The guide rib 43 is so designed as to be accommodated, on the one hand, in a first vertical groove 49 formed on the plate 41, and in a second vertical groove 31 formed on the surface 38 of the transmission member 3.

In an alternative embodiment, it can be provided so that the guide rib 43 of the roller 40 will be replaced by a groove, and that the grooves 49, 31 will be replaced by two guide ribs.

The gear 5, shown in greater detail in FIGS. 4 and 5, may consist of two half gears RI and R2 assembled in one piece. They have a central hole 53 into which a bore 50 for positioning the connecting rod 61 (FIG. 3D) by means of a transmission shaft 62 (FIG. 3D) opening.

The annular linear link B between the gear 5 and the connecting rod 6 (FIG. 2) is provided by a spacing between the inner surfaces of the central hole 53 and the side faces of the connecting rod eye 61 enabling the translational movement of the connecting rod 6 on the transmission axis 62.

It is also provided by giving a rounded profile to the bore 63 of the connecting rod eye 61, which receives the transmission axis 62. This profile enables the swiveling of the connecting rod 6 along the main and transverse rotation axes. The connecting rod 6 is shown in FIG. 6.

The gear 51 comprises a first toothing engaging with the teeth 34 of the large rack 35 of the transmission member 3. It comprises a second toothing 52 engaging with the large rack 73 of the control member 7. This arrangement between the gear 5, and respectively, the control member 7 and the transmission member 3 forms the rack and pinion links disclosed above.

Figure 3D:
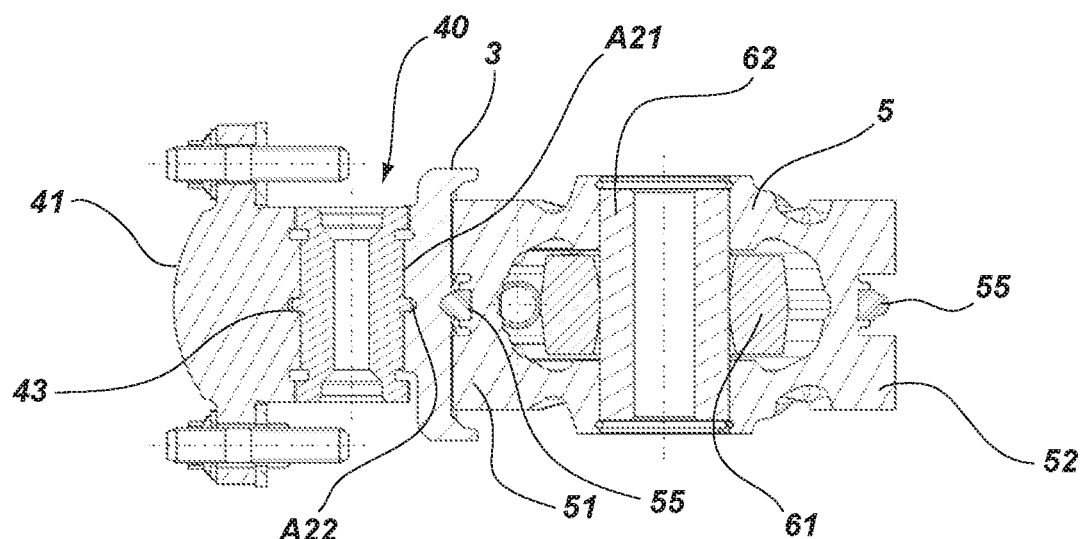
FIG. 3D shows a section along the axis F of FIG. 3c of some elements of the transmission device according to a particular exemplary implementation of the invention.

According to the invention, such arrangement is also provided with an annular linear link C, D making it possible to keep the gear 5 centered on the large racks 35, 73. This additional link was not present in the known solutions of the prior art. Each toothing 51, 52 is provided, in the middle thereof, with a groove 54 coaxial with the pitch circle of the gear 5. Inside each groove 54, a roll band 55 with a bulging profile is fixed. It may, for example, be a toroidal-shaped roll band. The transmission member 3 and the control member 7 each have a raceway 30, 70, respectively, the U-shape of which matches that of the bulging portion of the roll band 55, designed to contact and receive this bulging part, as can be seen in FIG. 3D.

In an alternative solution, the raceways 30, 70 of the transmission member 3 and the control member 7 may be bulging and the roll band 55 of the gear 5 have the matching U-shape.

In FIGS. 4 and 5, the pivoting axis of the gear 5 located in the bore 50 is positioned at the center of the pitch circle of the gear 5. This configuration makes it possible to control the engine compression rate only via the control member 7. It is, however, possible, while remaining within the scope of the invention, to shift the pivoting axis of the center of the pitch circle of the gear 5 so as to vary the kinematics of the combustion piston 2 and thereby obtain a control of the engine displacement.

Figure 7A:
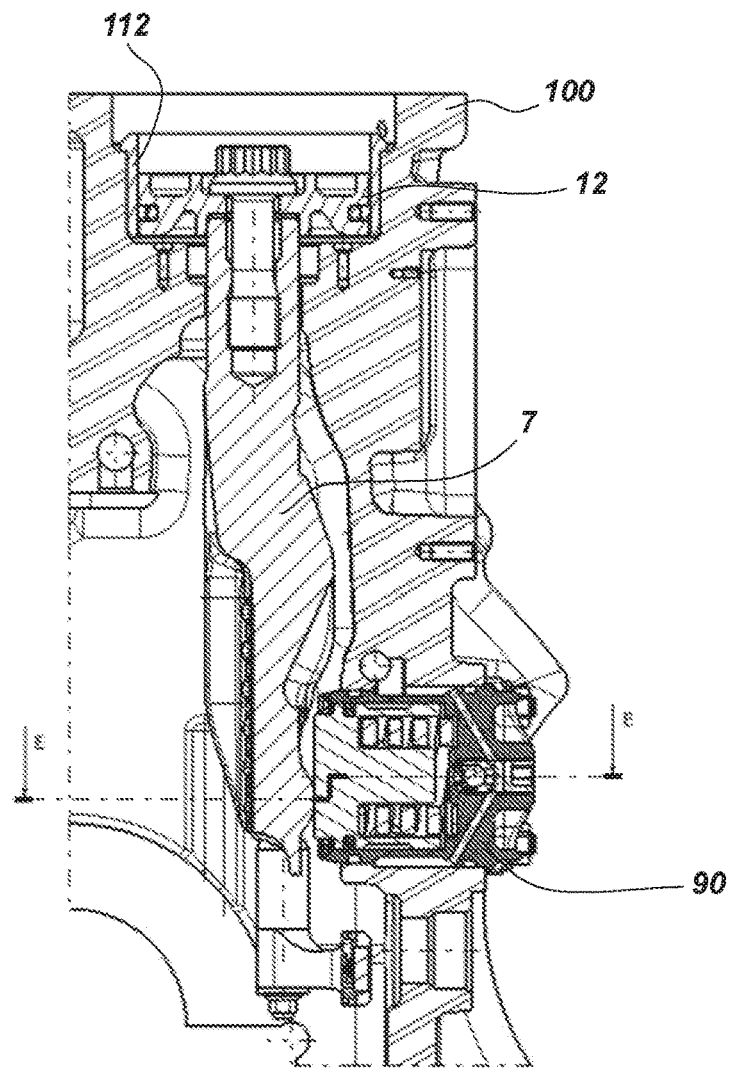
FIGS. 7A and 7B show cross-sections of the control member and the control piston according to two particular exemplary implementations of the invention.
Figure 7A:
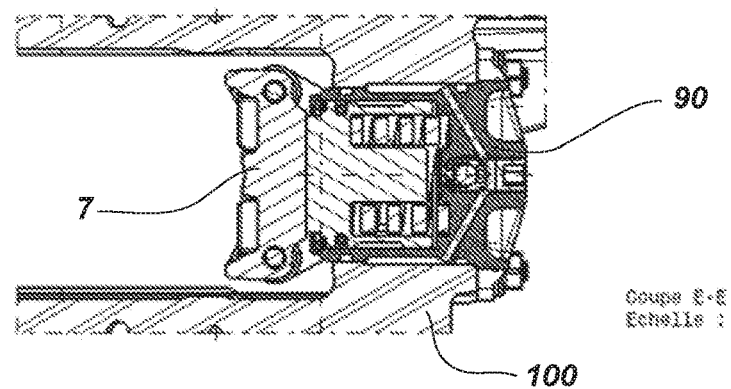
Figure 7B:
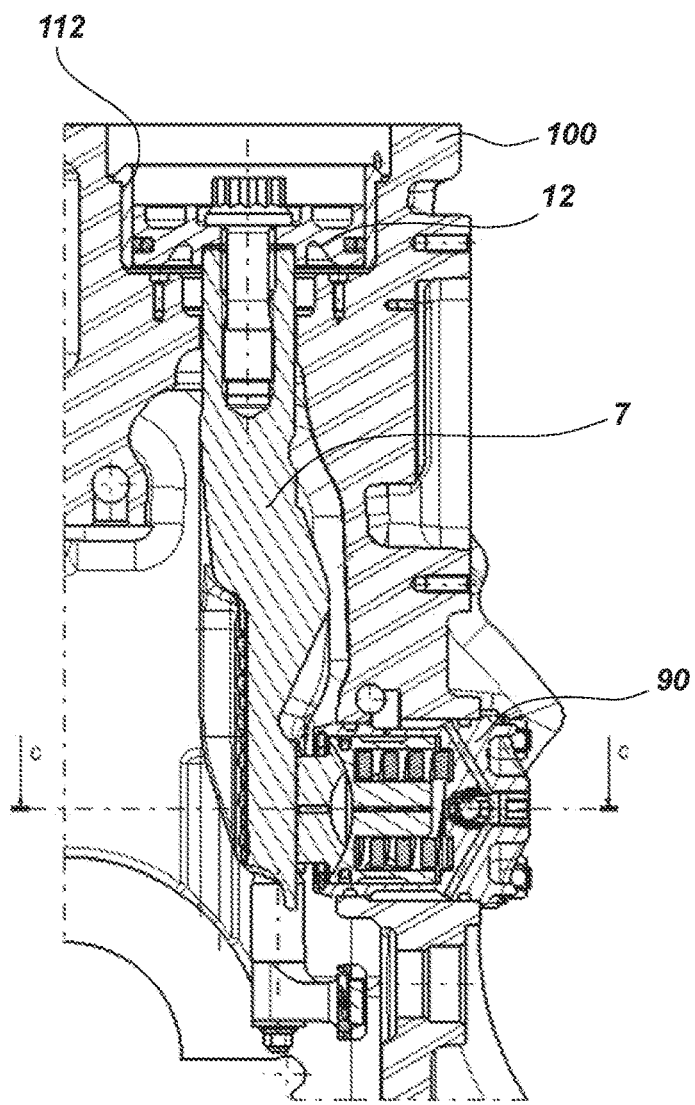
Figure 7B:
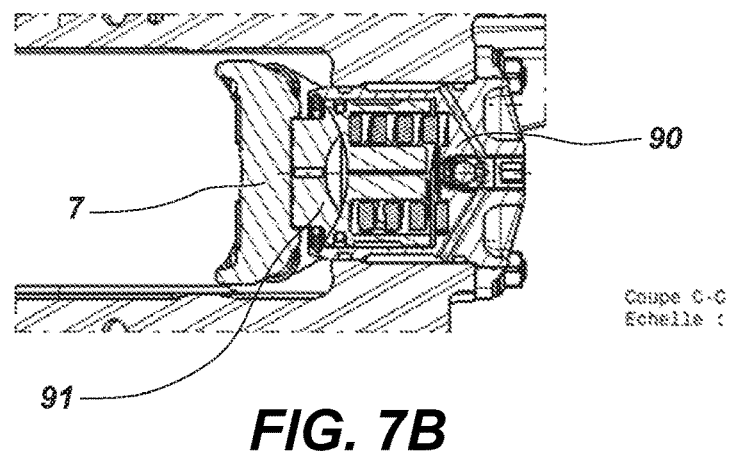

As shown in FIGS. 7A and 7B, the control element 7 is secured to the control piston 12. The part of the control piston 12 in contact with the inner surfaces of the control cylinder 112, which can have a bulging profile, forms the annular linear link E2.

In these figures, the cylinder housing 100 is also provided with a pressing device 90 making it possible to compensate for the running clearances, which may exist between the mobile members of the engine. Within the scope of the present invention, it will be assumed that the pressing device 90 is an integral part of the cylinder housing 100.

The control member 7 is connected with the pressing device 90 of the cylinder housing 100.

FIG. 7A, corresponding to the preferred solution of implementation of this link, shows an exemplary embodiment of the straight linear link E1 in the longitudinal direction. In this figure, the control member 7 has a cylindrical support surface along a longitudinal axis in contact with a flat surface of a piston of the pressing device 90. In an alternative solution not shown, the cylindrical surface along the longitudinal axis can be supported by the piston of the pressing device 90 and come into contact with a flat surface formed on the control member 7.

FIG. 7B shows an exemplary embodiment of the annular linear link E1' corresponding to the variant of the preferred solution of implementation of this link. A body 91 consisting of a spherical portion engages with a matching hole of the pressing device 90 in order to provide a ball joint, mobile in rotation along the three main, transverse and longitudinal axes. The control member 7, on its face opposite the large toothing, has a groove in which a tab of the body 91 can slide, on the side opposite the spherical portion thereof. This blocks the translation along the longitudinal axis, with the translation along the transverse axis being, of course, blocked by the control member 7 contacting the cylinder housing 100 of the pressing device 90. Of course, placing the groove on the body 91 and the tab on the control member 7, could be preferred.

Figure 1A:
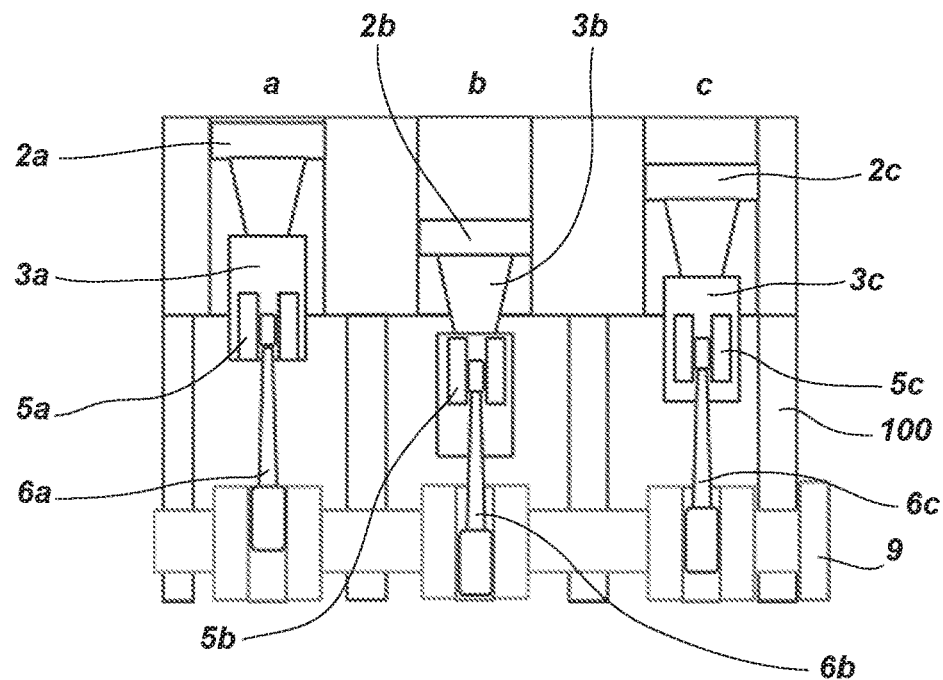
FIGS. 1A and 1B schematically and, respectively, show the design position and a position of equilibrium of some mobile members of an engine of the prior art.
Figure 1B:
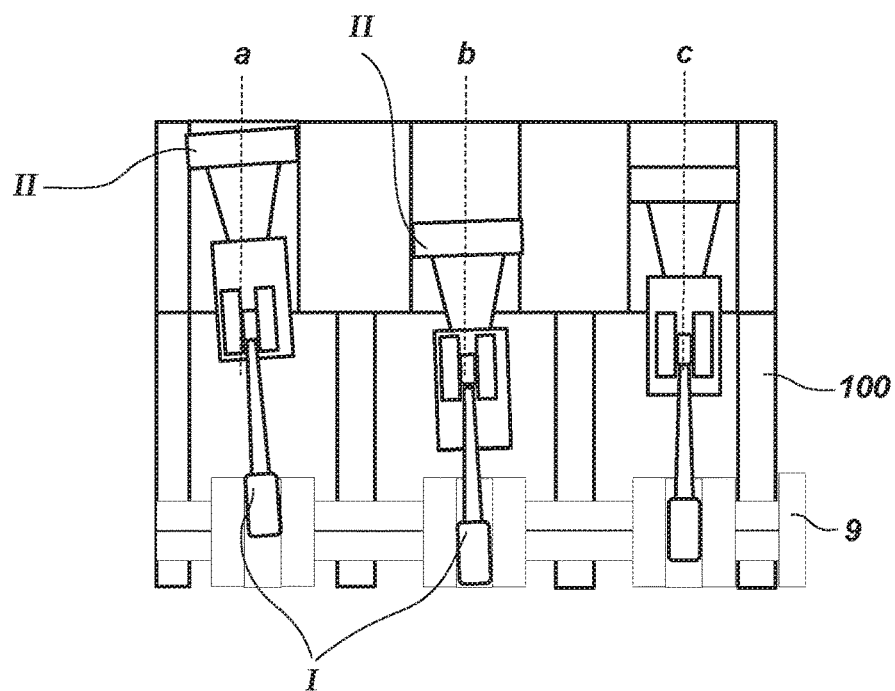
Figure 8:
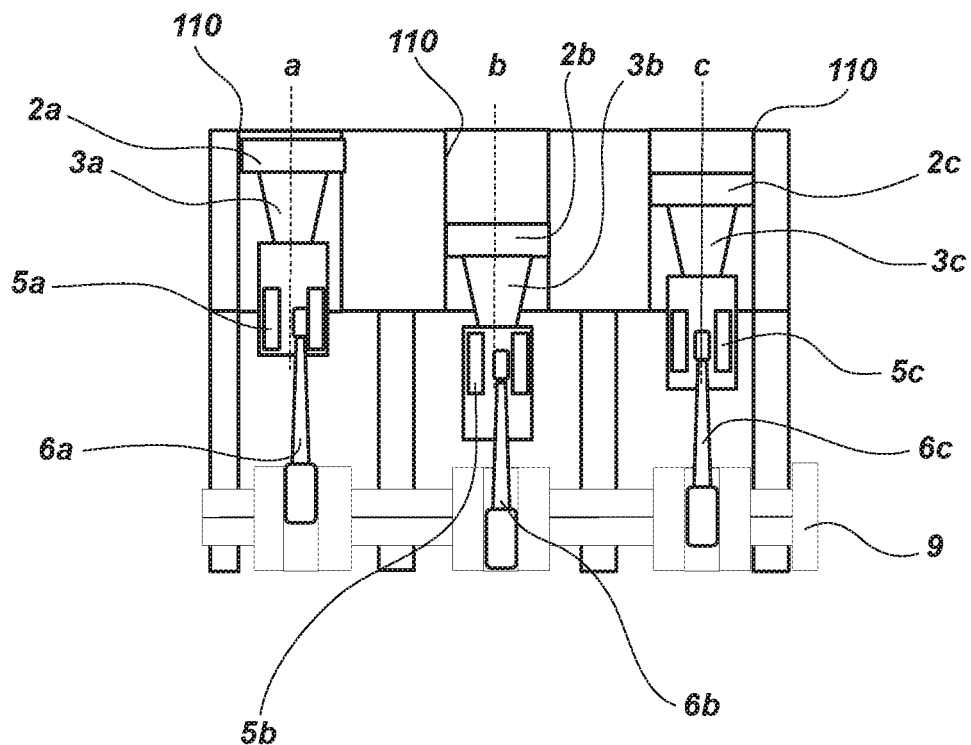
FIG. 8 schematically shows a position of equilibrium of some mobile elements of an engine according to the invention.
Figure 2:
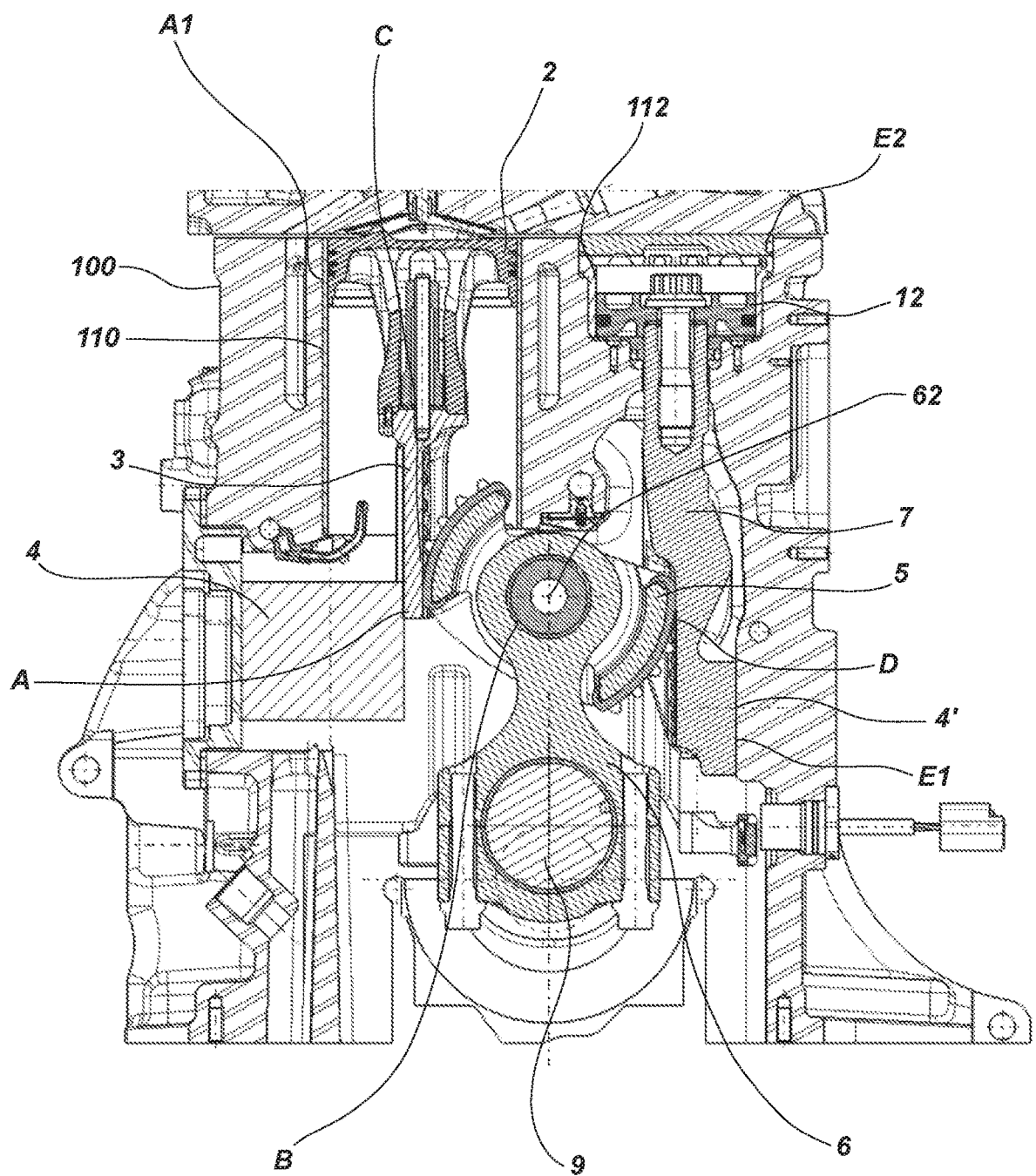
Figure 3C:
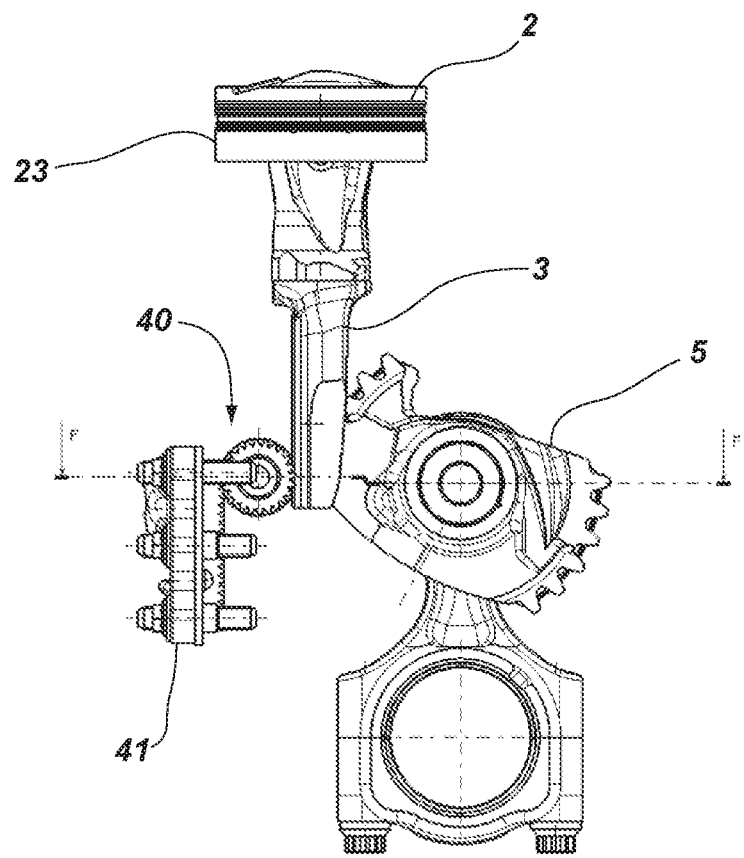
Figure 3D:
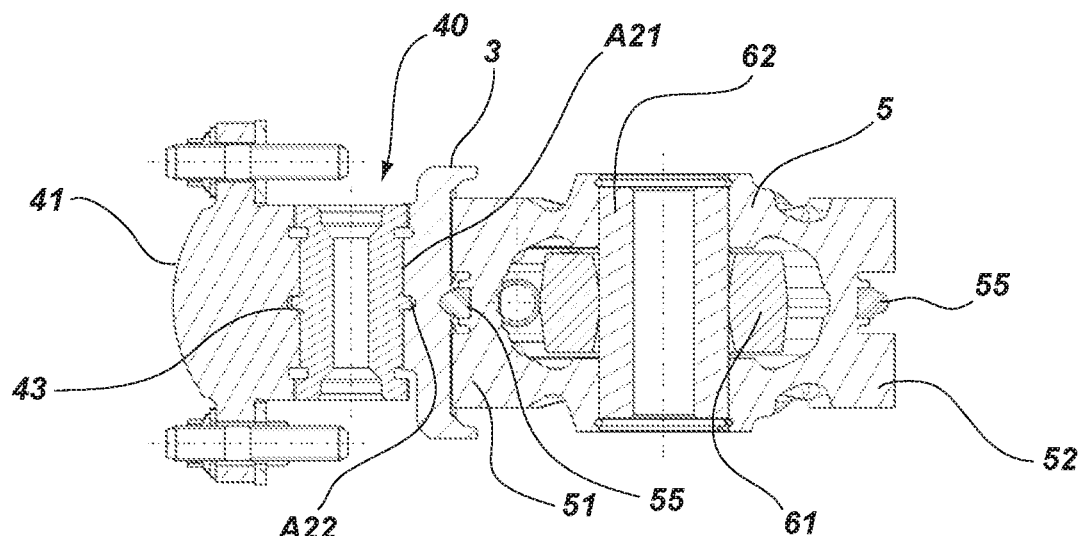

FIG. 8 schematically shows a position of equilibrium of some mobile members of the transmission device 1 (FIG. 3A), which has just been described as an example. It can be noted, contrary to the position taken by the elements shown in FIG. 1B in the case of an engine of the prior art, that, for each engine cylinder-assembly:

the combustion pistons 2a, 2b and 2c and the transmission members 3a, 3b and 3c are oriented in a main direction, thus, limiting friction with the combustion cylinders 110;

the gears 5a, 5b and 5c are centered on the transmission members 3a, 3b, 3c;

the connecting rods 6a, 6b and 6c are also oriented in a main direction, thus providing an efficient transmission of forces and limiting wear on the connecting rod bearings.

It can be seen in FIG. 8 that the members shown of the transmission device 1 keep an orientation determined relative to the cylinder housing 100 in spite of the disturbances caused by the displacements between the top mobile members and the low mobile members related to the expansion in this specific example.

Of course, the invention is not limited to the examples described and variants can be applied to the embodiments thereof, without departing from the scope of the invention as defined in the claims.

The invention claimed is:

1. A transmission device for an engine with a variable compression rate and/or a variable displacement, the transmission device comprising, in a cylinder housing:

a combustion piston capable of moving in a combustion cylinder of the engine and secured to a transmission member;

a gear linked with a first rack of the transmission member and providing transmission of the movement between the combustion piston and a crankshaft of the engine;

a connecting rod linked, at a first end, with the gear and linked, at a second end, with the crankshaft, a major axis of the crankshaft defining a longitudinal direction; and a control member linked with the gear and secured to a control piston; and wherein the combustion piston and the transmission member are slidably linked with the cylinder housing in a main direction, the main direction defined by an axis of the combustion cylinder, the sliding link providing five degrees of blocking and allowing a single translation movement in the main direction;
wherein the sliding link is provided by a roller bearing on a plate of the cylinder housing and on the transmission member and is provided by a rib and a guide groove adapted to receive the rib, with one being arranged on the roller and the other one being arranged on the transmission member;
wherein a link between the gear and the connecting rod is an annular linear link in the longitudinal direction;
wherein a link between the gear and the transmission member is formed of a rack and pinion link and an annular linear link in the main direction;
wherein a link between the gear and the control member is formed of a rack and pinion link and an annular linear link in the main direction.

2. The transmission device according to claim 1, wherein the gear has a central hole wherein a bore opens for the positioning of a connecting rod eye by means of a transmission shaft and wherein the annular linear link between the gear and the connecting rod is obtained by:
a spacing between the inner surfaces of the central hole of the gear and the side faces of the connecting rod for the translational movement of the connecting rod on the transmission shaft; and
a rounded profile of the connecting rod eye bore for the swiveling of the connecting rod in the central hole.

3. The transmission device according to claim 2, wherein the annular linear link between the gear and the transmission member respectively comprises a roll band of the gear in contact with a raceway of the transmission member, bulging and U-shapes of which are engaged one in the other.

4. The transmission device according to claim 3, wherein the annular linear link between the gear and the control member respectively comprises a roll band of the gear in contact with a raceway of the control member, the bulging and U-shapes of which are engaged one in the other.

5. The transmission device according to claim 4, wherein a link between the control piston and the cylinder housing includes an annular linear link in the main direction and having a center formed by the control piston.

6. The transmission device according to claim 5, wherein a link between the control member and the cylinder housing comprises a straight linear link in the longitudinal direction.

7. The transmission device according to claim 6, wherein the straight linear link between the control member and the cylinder housing is provided by the contact between a bearing surface of the control member and a surface of the cylinder housing, with one being cylindrical with a longitudinal axis, and the other one being flat.

8. The transmission device according to claim 6, wherein the link between the control member and the cylinder housing also comprises an annular linear link in the main direction.

9. The transmission device according to claim 8, wherein the annular linear link between the control member and the cylinder housing is provided by a body consisting of a spherical portion in contact with a matching hole of the cylinder housing, with the body having, on the side opposite the spherical portion, a tab or a groove respectively engaging with a groove or a tab of the control member.

10. The transmission device according to claim 9, wherein the cylinder housing is provided with a pressing device for compensating running clearances.

11. The transmission device according to claim 1, wherein the annular linear link between the gear and the transmission member respectively comprises a roll band of the gear in contact with a raceway of the transmission member, bulging and U-shapes of which are engaged one in the other.

12. The transmission device according to claim 1, wherein the annular linear link between the gear and the control member respectively comprises a roll band of the gear in contact with a raceway of the control member, bulging and U-shapes of which are engaged one in the other.

13. The transmission device according to claim 1, wherein a link between the control piston and the cylinder housing includes an annular linear link in the main direction and having a center formed by the control piston.

14. The transmission device according to claim 1, wherein the cylinder housing is provided with a pressing device for compensating running clearances.

* * * * *